United States Patent
Huang

(10) Patent No.: US 9,134,488 B2
(45) Date of Patent: Sep. 15, 2015

(54) OPTICAL COUPLING CONNECTOR AND OPTICAL COUPLING ASSEMBLY

(71) Applicant: HON HAI PRECISION INDUSTRY CO., LTD., New Taipei (TW)

(72) Inventor: Hsin-Shun Huang, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/583,980

(22) Filed: Dec. 29, 2014

(65) Prior Publication Data

US 2015/0205057 A1 Jul. 23, 2015

(30) Foreign Application Priority Data

Jan. 20, 2014 (TW) .............................. 103101962 A

(51) Int. Cl.
  *G02B 6/42* (2006.01)
  *G02B 6/43* (2006.01)
(52) U.S. Cl.
  CPC ............ *G02B 6/4204* (2013.01); *G02B 6/4243* (2013.01); *G02B 6/43* (2013.01)
(58) Field of Classification Search
  CPC .. G02B 6/2404; G02B 6/4243; G02B 6/4214; G02B 6/43
  USPC ..................................................... 385/88–90
  See application file for complete search history.

(56) References Cited

U.S. PATENT DOCUMENTS

| | | | | |
|---|---|---|---|---|
| 4,911,516 A * | 3/1990 | Palfrey et al. | ................... | 385/37 |
| 5,577,040 A * | 11/1996 | Klumpp | ........................ | 370/487 |
| 5,611,006 A * | 3/1997 | Tabuchi | .......................... | 385/14 |
| 5,706,270 A * | 1/1998 | Iizuka et al. | ............. | 369/112.29 |
| 7,300,217 B2 * | 11/2007 | Mizoguchi | ....................... | 385/92 |
| 2002/0018627 A1 * | 2/2002 | Kato et al. | ....................... | 385/93 |
| 2004/0207822 A1 * | 10/2004 | Lee et al. | ........................ | 353/98 |
| 2010/0048080 A1 * | 2/2010 | Bland et al. | .................. | 442/386 |
| 2010/0210910 A1 * | 8/2010 | Shimotsu | ...................... | 600/178 |
| 2012/0328278 A1 * | 12/2012 | Liang et al. | .................... | 396/155 |
| 2013/0128609 A1 * | 5/2013 | Wang et al. | .................... | 362/606 |
| 2015/0071593 A1 * | 3/2015 | Kanke | ............................ | 385/89 |

* cited by examiner

*Primary Examiner* — Akm Enayet Ullah

(74) *Attorney, Agent, or Firm* — Novak Druce Connolly Bove + Quigg LLP

(57) ABSTRACT

An optical coupling connector includes a main body and at least one optical fiber fixed to the main body. The main body includes a top surface, a first bottom surface, an outer side surface perpendicularly connecting with the top surface. The top surface defines an opening. The opening includes a second bottom surface. The first bottom surface includes at least one second coupling lens, the second bottom surface includes at least one first coupling lens, central axis of each first coupling lens and central axis of each second coupling lens are coaxial with each other. Each optical fiber includes an incident surface, an angle between the incident surface and a horizontal surface is about 45 degrees, and the incident surface is arranged toward the first coupling lens.

16 Claims, 10 Drawing Sheets

OPTICAL COUPLING CONNECTOR AND OPTICAL COUPLING ASSEMBLY

FIELD

The subject matter herein generally relates to fiber optical communications.

BACKGROUND

In the field of fiber optic communications, an optical coupling connector often includes an optical coupling main body and at least one optical fiber, the optical coupling main body includes at least one coupling lens corresponding with the optical fiber, the coupling lens is aligned to the optical fiber to realize transmission of optical signals. Transmission quality of the optical signals is determined by the alignment between the coupling lens and the optical fiber.

BRIEF DESCRIPTION OF THE DRAWINGS

Implementations of the present technology will now be described, by way of example only, with reference to the attached figures.

DETAILED DESCRIPTION

Figure 1:
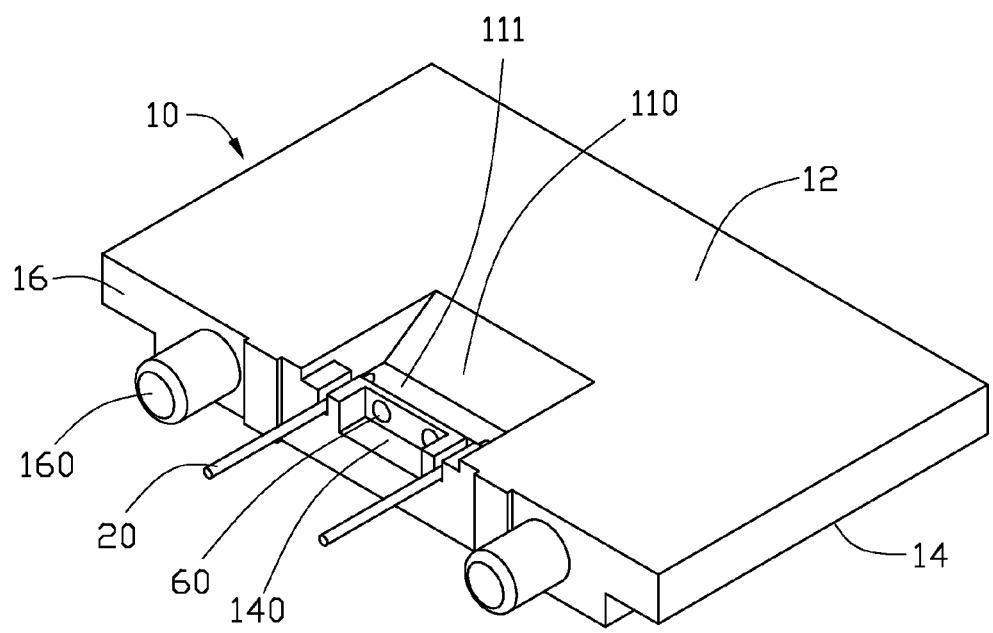
FIG. 1 is an isometric view of an optical coupling connector, in accordance with a first embodiment.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising," when utilized, means "including, but not necessarily limited to"; it specifically indicates open-ended inclusion or membership in the so-described combination, group, series and the like. The references "a plurality of" and "a number of" mean "at least two."

FIG. 1 shows an optical coupling connector 100. The optical coupling connector 100 includes an optical coupling main body 10 and a number of optical fibers 20 fixed with the optical coupling main body 10.

The optical coupling main body 10 is substantially a cuboid made of transparent material. The optical coupling main body 10 includes a top surface 12, a first bottom surface 14 opposite to the top surface 12, and a outer side surface 16 perpendicularly connecting with the top surface 12 and the first bottom surface 14, as shown in FIG. 1.

Figure 2:
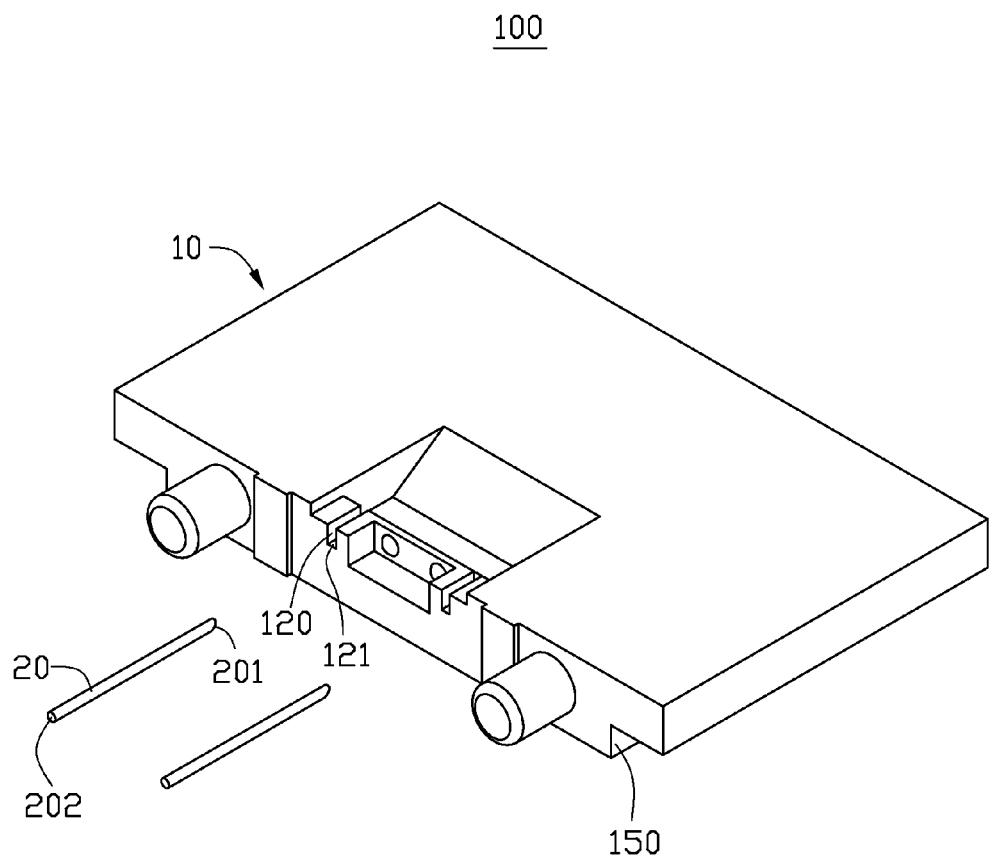
FIG. 2 is an exploded isometric view of the optical coupling connector of FIG. 1.
Figure 3:
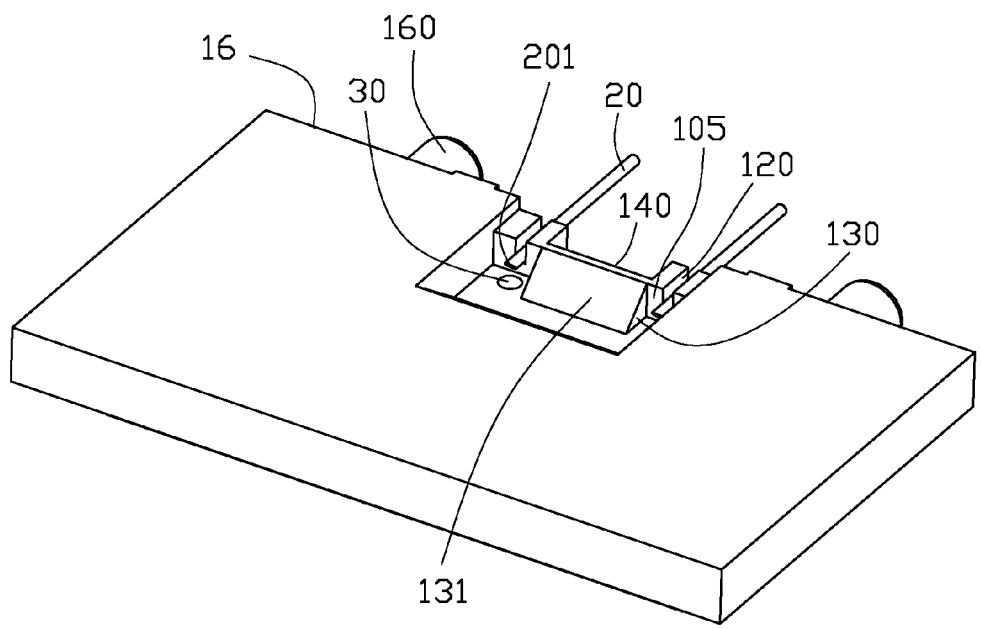
FIG. 3 is similar to FIG. 1, but viewed from another angle.

The top surface 12 defines an opening 110. The opening 110 includes a second bottom surface 111, a first inner side surface 105 perpendicularly connecting with the second bottom surface 111, and a second inner surface 110 inclined to and connecting with the second bottom surface 111, as shown in FIGS. 2-3. The first inner surface 105 is parallel to the outer side surface 16. The second bottom surface 111 is parallel to the first bottom surface 14 and is arranged with a number of first coupling lenses 30.

Figure 4:
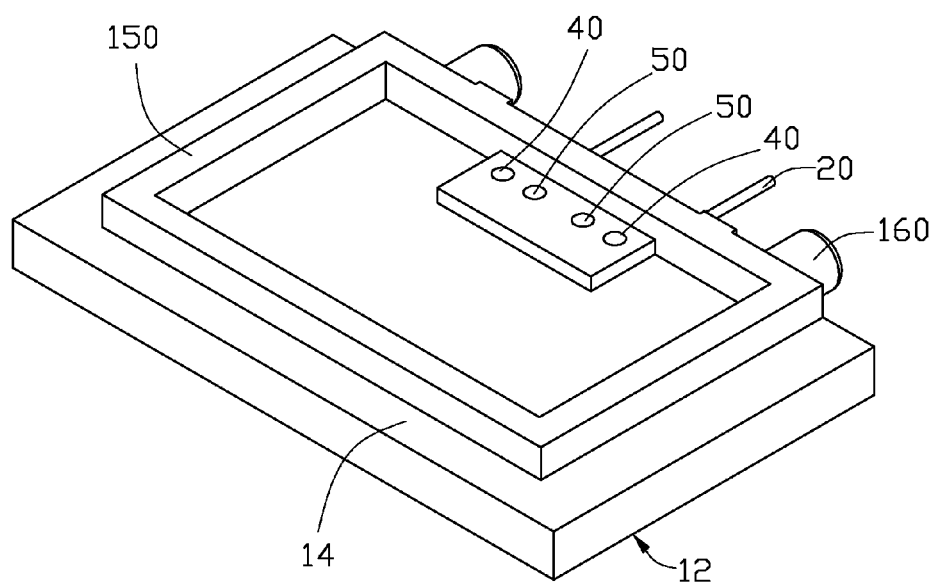
FIG. 4 is similar to FIG. 1, but viewed from another angle.

The first bottom surface 14 is arranged with a number of second coupling lenses 40 and a number of third coupling lenses 50, as shown in FIG. 4. A quantity of the first coupling lens 30 is equal to that of the second coupling lens 40. In the illustrated embodiment, the number of the first coupling lens 30, the second coupling lens 40 and the third coupling lens 50 is two, respectively, although the invention is not so limited. The two third coupling lenses 50 are arranged beside the two second coupling lenses 40 respectively. Center points of the second coupling lenses 40 and center points of the third coupling lenses 50 are at a same line. Each first coupling lens 30 is aligned with the second coupling lens 40. An central axis of each first coupling lens 30 and an central axis of each second coupling lens 40 are coaxial with each other.

The optical coupling main body 10 defines at least one receiving groove 120, as shown in FIG. 2. The receiving groove 120 extends throughout the outer side surface 16 and the first inner surface 105. In the illustrated embodiment, the number of the receiving grooves 120 is two and is substantially square shaped, although the invention is not so limited. In other embodiments, the receiving grooves can also be V-shaped. The receiving grooves 120 correspond with the first coupling lenses 30. The receiving grooves 120 are configured for receiving optical fibers 20. The receiving groove includes a supporting surface 121, the supporting surface 121 is higher than the second bottom surface 111.

The optical coupling main body 10 includes a reflecting portion 130, as shown in FIG. 3. The reflection portion 130 is arranged on the second bottom surface 111 and located between the two first coupling lenses 30. The reflecting portion 130 includes a reflecting surface 131, an angle between the reflecting surface 131 and the first inner surface 105 is about 45 degrees.

The optical coupling main body 10 includes a recess 140, as shown in FIG. 1 and FIG. 3. The recess 140 is opened from the outer side surface 16 and arranged between the two receiving grooves 120. The recess 140 is arranged with two fourth coupling lenses 60. Each of the fourth coupling lenses 60 is corresponding with each of the third coupling lenses 50. An central axis of each third coupling lens 50 and an central axis of each corresponding fourth coupling lens 60 are orthogonal to each other. The first, second, third, fourth coupling lenses 30, 40, 50, 60 can each be a convex lens or a Fresnel lens.

The optical coupling main body 10 includes a protrusion 150, as shown in FIG. 4. The protrusion 150 is a closed rib extending away from the first bottom surface 14 along a periphery of the first bottom surface 14. The second coupling lens 40 and the third coupling lens 50 are surrounded by the protrusion 150.

The optical coupling main body 10 includes two positioning posts 160, as shown in FIG. 1, the positioning post 160 is arranged on the outer side surface 16 and extends away from the outer side surface 16. The positioning post 160 is configured to connect with another optical coupling main body.

Figure 8:
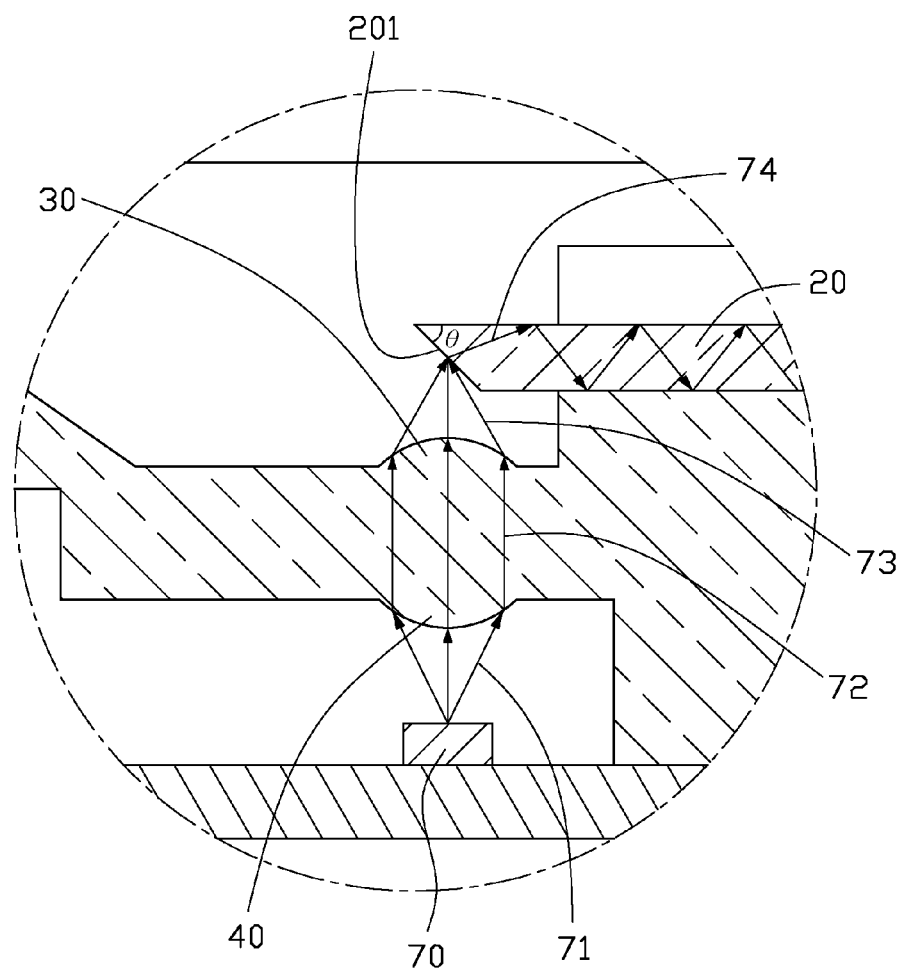
FIG. 8 is an enlarged view of circled portion VIII of FIG. 7.

The optical fiber 20 is received in the receiving grooves 120, as shown in FIG. 1. The optical fiber 20 includes an incident surface 201 and an end 202 far away from the incident surface 201. The incident surface 201 is inclined relative to the end 202. An angle 8 between the incident surface 201 and a horizontal surface is about 45 degrees, as shown in FIG. 8. The incident surface 201 is arranged toward the first coupling lens 30. In the illustrated embodiment, the optical fiber 20 is fixed in the receiving grooves 120 using adhesive and a focus point of the first coupling lens 30 is projected on the incident surface 201.

Figure 5:
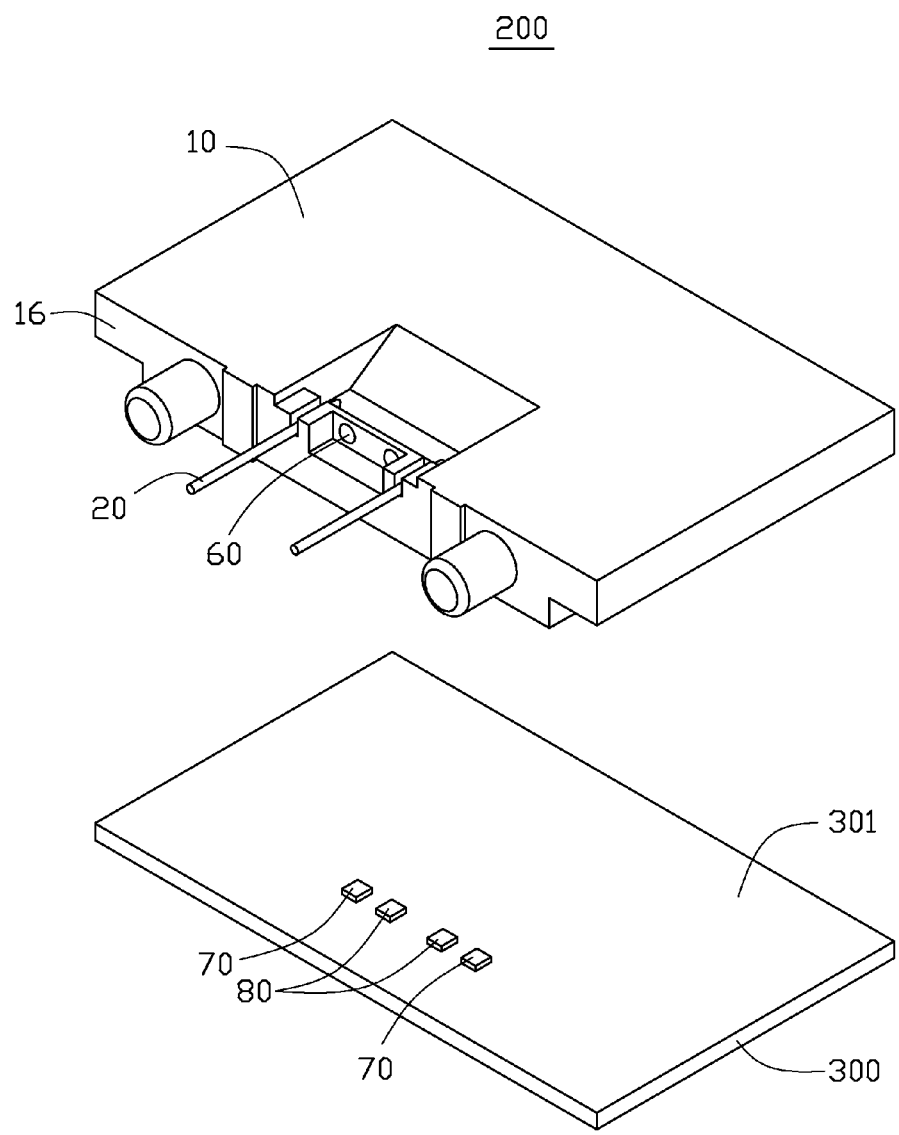
FIG. 5 is an exploded isometric view of an optical coupling assembly, in accordance with a second embodiment.
Figure 6:
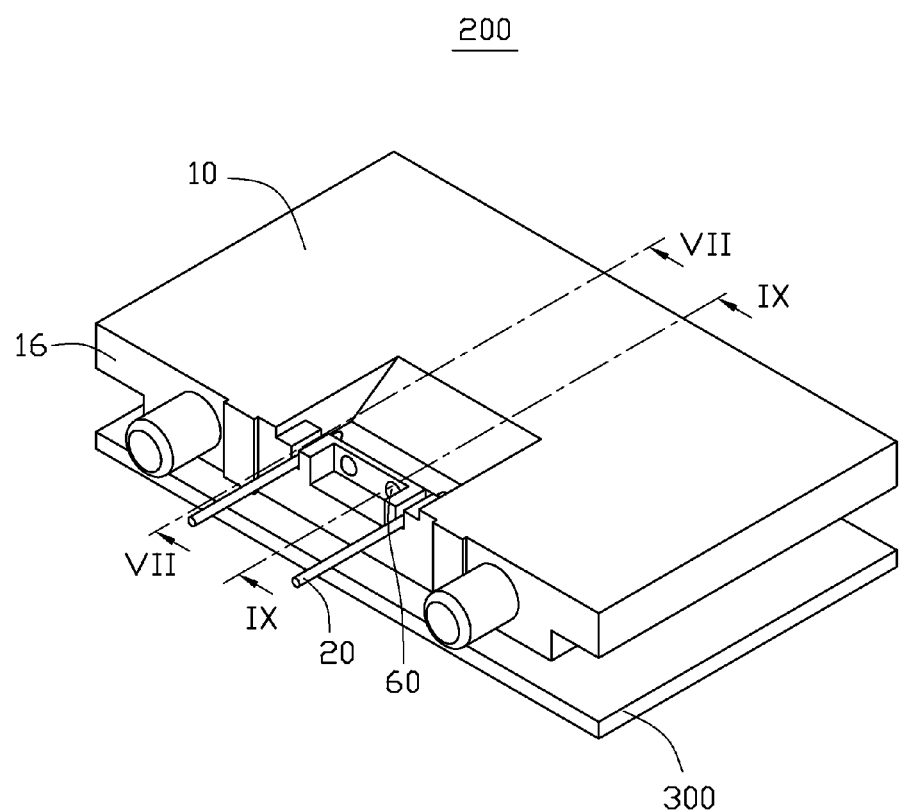
FIG. 6 is an isometric view of the optical coupling assembly.

FIGS. 5-6 illustrate an optical coupling assembly 200. The optical coupling assembly 200 includes the optical coupling connector 100 and a printed circuit board 300. The printed circuit board 300 includes a mounting surface 301. The mounting surface 301 is arranged with at least one light emitter 70 and at least one light receiver 80 distributed in a line. In the embodiment, the numbers of the light emitters 70 and the light receivers 80 are two, respectively. Each light emitter 70 is a laser diode (LD) for emitting light beams. Each light receiver 80 is a photodiode (PD) for receiving light beams. When the optical coupling connector 100 is assembled with the printed circuit board 300, the two light emitters 70 are aligned with two second coupling lenses 40, the two light receivers are aligned with two third coupling lenses 50.

Figure 7:
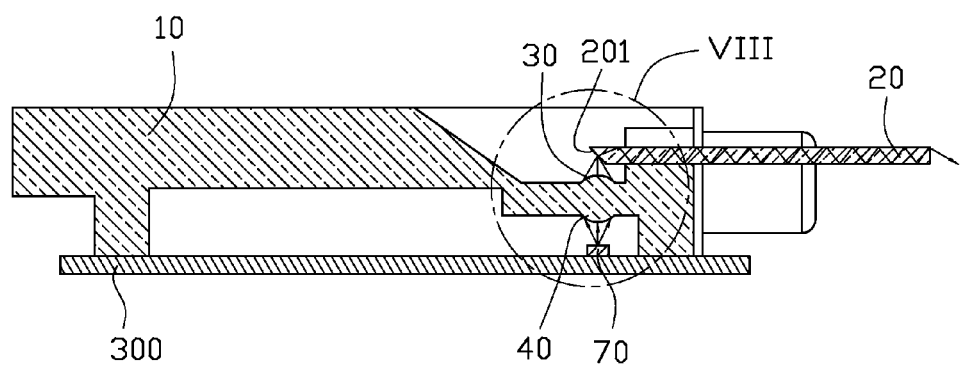
FIG. 7 is a cross sectional view taken along line VII-VII of the optical coupling assembly of FIG. 6.
Figure 9:
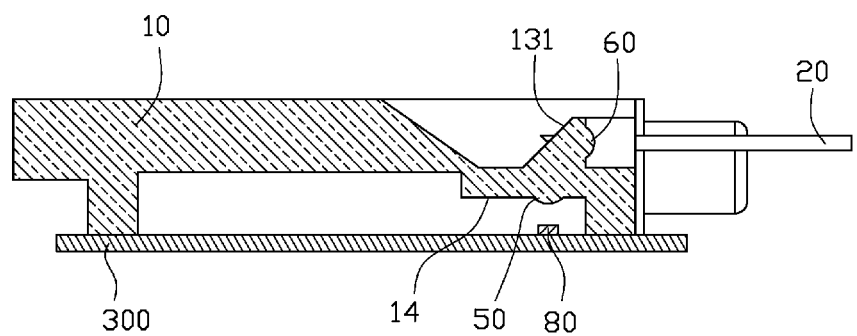
FIG. 9 is a cross sectional view taken along line IX-IX of the optical coupling assembly of FIG. 6.
Figure 10:
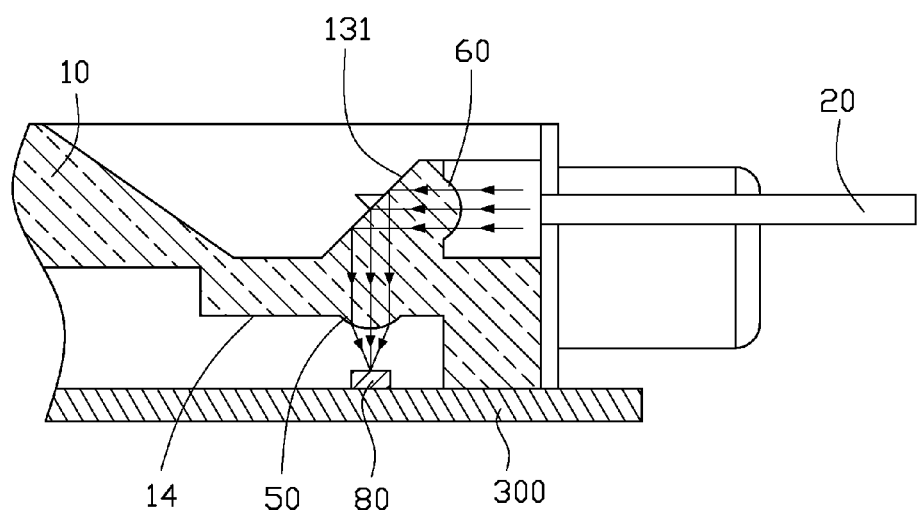
FIG. 10 is a working principle of the optical coupling assembly in FIG. 9.

A working principle of the optical coupling assembly 200 is described as follows. When the optical coupling assembly 200 is in use, each light emitter 70 emits a first light beam 71, as shown in FIGS. 7 and 8. The first light beam 71 projects on the second coupling lens 40, and is collimated by the second coupling lens 40 and then changed into parallel beams 72, the parallel beams 72 are converged to third beams 73 by the first coupling lens 30 and then the third beams 73 are converged to fourth beams 74 and projected to the incident surface 201 of the optical fibers and emitted out from the optical fibers 20. A second light beams emitted from another light emitter (not shown) are projected on the fourth coupling lenses 60, and reflected by the reflecting surface 131, then converged by the third coupling lens 50, and finally received by the light receivers 80, as shown in FIG. 9 and FIG. 10.

The optical coupling assembly can be assembled as follows. The optical coupling assembly is provided with some or all of the components described herein. A fiber optical cable 20 is cut at one end at approximately 45 degrees to define incident surface 201. Fiber optical cable 20 is then laid in groove 120 such that incident surface 201 is aligned with the lenses as shown in FIG. 8. This process is repeated for other optical fiber cables in other grooves as appropriate.

The embodiments shown and described above are only examples. Therefore, many such details are neither shown nor described. Even though numerous characteristics and advantages of the present technology have been set forth in the foregoing description, together with details of the structure and function of the present disclosure, the disclosure is illustrative only, and changes may be made in the details, including in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. An optical coupling connector comprising:
   an optical coupling main body comprising a top surface, a first bottom surface opposite to the top surface, an outer side surface perpendicularly connecting with the top surface and the first bottom surface, and a plurality of receiving grooves;
   the top surface defining an opening, the opening comprising a second bottom surface parallel with the first bottom surface and a first inner side surface perpendicularly connecting with the second bottom surface, the first bottom surface is arranged with a plurality of second coupling lenses, the second bottom surface arranged with a plurality of first coupling lenses, an central axis of each first coupling lens and an central axis of each second coupling lens being coaxial with each other, the receiving grooves extending throughout the outer side surface and the inner side surface; and
   a plurality of optical fibers, each optical fiber being fixed in respective the receiving groove;
   wherein each optical fiber comprises an incident surface and an end far away from the incident surface, the incident surface is inclined relative to the end, an angle between the incident surface and a horizontal surface is about 45 degrees, and the incident surface is arranged toward the first coupling lens.

2. The optical coupling connector of claim 1, wherein the first bottom surface comprises a plurality of third coupling lenses, the two third coupling lenses are arranged beside the two second coupling lenses 40 respectively.

3. The optical coupling connector of claim 2, wherein the optical coupling main body comprises a reflecting portion, the reflection portion is arranged on the second bottom surface and located between the first coupling lenses, the reflecting portion comprises a reflecting surface, an angle between the reflecting surface and the first inner surface is about 45 degrees.

4. The optical coupling connector of claim 3, wherein the optical coupling main body comprises a recess, the recess is opened from the outer side surface and located between the receiving grooves, the recess is arranged with at least one coupling lenses, each the fourth coupling lens is corresponded with the third coupling lens, and an central axis of each third coupling lens and an central axis of each corresponding fourth coupling lens are orthogonal to each other.

5. The optical coupling connector of claim 4, wherein the optical coupling main body comprises a protrusion, the protrusion is a closed rib extends away from the first bottom surface and along a periphery of the first bottom surface, the second coupling lens and the third coupling lens are surrounded by the protrusion.

6. The optical coupling connector of claim 5, wherein the optical coupling main body comprises two position posts, the positioning post is arranged on the outer side surface and extends away from the outer side surface.

7. The optical coupling connector of claim 6, wherein the optical fiber is fixed in the receiving groove using adhesive and a focus point of the first coupling lens is projected on the incident surface.

8. An optical coupling assembly comprising:
an optical coupling main body comprising a top surface, a first bottom surface opposite to the top surface, an outer side surface perpendicularly connecting with the top surface and the first bottom surface and a plurality of receiving grooves, the top surface defining an opening, the opening comprising a second bottom surface parallel with the first bottom surface and a first inner side surface perpendicularly connecting with the second bottom surface, the first bottom surface is arranged with at least one second coupling lenses and at least one third coupling lenses, the second bottom surface is arranged with a plurality of first coupling lenses, an central axis of each first coupling lens and an central axis of each second coupling lens are coaxial with each other, the receiving grooves extending throughout the outer side surface and the inner side surface; a plurality of optical fibers, each optical fiber being fixed in respective the receiving groove; each optical fiber comprising an incident surface and an end far away from the incident surface, the incident surface being inclined relative to the end, an angle between the incident surface and a horizontal surface being about 45 degrees, and the incident surface being arranged toward the first coupling lens; and
a printed circuit board, the printed circuit board comprising a mounting surface, the mounting surface being arranged with at least one light emitter and at least one light receiver distributed in a line, each the light emitters being aligned with each second coupling lens, each light receiver being aligned with the third coupling lens.

9. The optical coupling assembly of claim 8, wherein the first bottom surface comprises a plurality of third coupling lenses, the two third coupling lenses are arranged beside the two second coupling lenses 40 respectively.

10. The optical coupling assembly of claim 9, wherein the optical coupling main body comprises a reflecting portion, the reflection portion is arranged on the second bottom surface and located between the first coupling lenses, the reflecting portion comprises a reflecting surface, an angle between the reflecting surface and the first inner surface is about 45 degrees.

11. The optical coupling assembly of claim 10, wherein the optical coupling main body comprises a recess, the recess is opened from the outer side surface and located between the receiving grooves, the recess is arranged with at least one coupling lenses, each the fourth coupling lens is corresponded with the third coupling lens, and an central axis of each third coupling lens and an central axis of each corresponding fourth coupling lens are orthogonal to each other.

12. The optical coupling assembly of claim 11, wherein the optical coupling main body comprises a protrusion, the protrusion is a closed rib extends away from the first bottom surface and along a periphery of the first bottom surface, the second coupling lens and the third coupling lens are surrounded by the protrusion.

13. The optical coupling assembly of claim 12, wherein the optical coupling main body comprises two positioning posts, the positioning post is arranged on the outer side surface and extends away from the outer side surface.

14. The optical coupling assembly of claim 12, wherein a central axis of the optical fiber is higher than the second bottom surface.

15. The optical coupling assembly of claim 12, wherein the optical fiber is fixed in the receiving groove using adhesive and a focus point of the first coupling lens is projected on the incident surface.

16. An optical coupling connector, comprising:
a support;
a first lens in the support, the support being configured to place the first lens over an optical emitter;
a groove in the support configured to support a fiber optical cable, the groove having a groove axis perpendicular to an optical axis of the first lens;
a fiber optical cable mounted in the groove along the groove axis, an incident end of the fiber optic cable having an approximately 45 degree angle to the groove axis and being substantially centered above the optical axis;
wherein the first lens is configured to receive light from the emitter and focus it on the incident end of the fiber optic cable.

* * * * *